United States Patent [19]
Zein Al Abedeen et al.

[11] Patent Number: 5,363,374
[45] Date of Patent: Nov. 8, 1994

[54] METHOD FOR ALLOCATING RESOURCES BY ANTICIPATED RESERVATION IN AN INTEGRATED SERVICE SATELLITE NETWORK

[75] Inventors: Tarif Zein Al Abedeen, Toulouse; Gérard Maral, Goyrans; Dominique Seret, Gif Sur Yvette; Marc Tondriaux, Castanet, all of France

[73] Assignee: France Telecom, Paris, France
[21] Appl. No.: 66,110
[22] PCT Filed: Oct. 2, 1992
[86] PCT No.: PCT/EP92/02292
  § 371 Date: Jun. 4, 1993
  § 102(e) Date: Jun. 4, 1993
[87] PCT Pub. No.: WO93/07694
  PCT Pub. Date: Apr. 15, 1993

[30] Foreign Application Priority Data
Oct. 4, 1991 [FR] France ................... 91 12257

[51] Int. Cl.⁵ .................... H04B 7/212; H04B 7/185
[52] U.S. Cl. .................... 370/95.3; 370/97
[58] Field of Search ........... 370/95.1, 953, 97, 104.1

[56] References Cited

U.S. PATENT DOCUMENTS

| | | | |
|---|---|---|---|
| 4,736,371 | 4/1988 | Tejima et al. | 370/95 |
| 5,012,469 | 2/1991 | Sardana | 370/95.1 |
| 5,121,387 | 6/1992 | Gerhardt et al. | 370/95.3 |
| 5,197,125 | 3/1993 | Engel et al. | 370/95.3 |
| 5,295,140 | 3/1994 | Crisler et al. | 370/95.3 |

FOREIGN PATENT DOCUMENTS
0433699 6/1991 European Pat. Off. .

OTHER PUBLICATIONS
Proceedings of the IEEE, vol. 79, No. 2, Feb. 1991, pp. 170–189.
Infococom '89, 23–27 Apr. 1989, vol. 2, pp. 632–640.

Primary Examiner—Wellington Chin
Attorney, Agent, or Firm—Jacobson, Price, Holman & Stern

[57] ABSTRACT

This invention relates to a method for allocating a resource in a periodic frame of an asynchronous digital satellite network, to each of cell bursts of sporadic connections which are transmitted by earth stations. Allocation requests for resources, such as a time intervals in a data sub-frame of a frame, are respectively transmitted by an earth station to a central network management station, from beginnings of reception of the bursts and therefore well before the earth station has completely received said bursts coming from an user station. Each of the resource allocation requests relating to the bursts of a connection is satisfied since the request does not comprise any information on lengths of bursts. Thus, during a connection phase, acceptance or refusal of a connection request is decided as a function of an algorithm avoiding overloading of the network and slumping of its performances.

4 Claims, 9 Drawing Sheets

METHOD FOR ALLOCATING RESOURCES BY ANTICIPATED RESERVATION IN AN INTEGRATED SERVICE SATELLITE NETWORK

BACKGROUND OF THE INVENTION

1. Field of the Invention

The present invention relates in a general manner to the resource control for satellite telecommunication networks using the asynchronous time-division technique ATM (Asynchronous Transfer Mode).

2. Description of the Prior Art

After the introduction of the services offered by the "narrow-band" integrated service digital networks, the network designers sensed the need to produce a more efficient network in the medium-term. This need was based on the following considerations: a "narrow-band" digital network does not enable complete integration of the existing or "futuristic" telecommunication services. The existing digital networks do not fully satisfy needs as regards data communications with very high bit rate, services generating a traffic flow of a highly sporadical nature, or in the long-term, video communications. The asynchronous time-division technique ATM was thus advocated to meet three requirements: digital technology, high bit rate, and flexibility in the routing of the different types of communications.

An international strategy for the development of "wide-band" integrated service digital networks (WB-ISDN), defined by the CCITT, is based on three fundamental principles:

an information transfer unit, called "cell", or also "packet", which is the basic element processed by all means constituting the network: terminals, multiplexers and switches. An ATM cell typically comprises 53 bytes, 48 being allocated to the transmission of information and 5 to the routing of the cell in the network, an asynchronous processing of the cells by the various means in the network, and a connection-oriented technique: a communication must be set up prior to all transfers of information. The mode selected is the "virtual-circuit" mode for the transmission of the cells throught the nodes of the network, of a type comparable to X.25 networks.

The conventional networks using the circuit mode, which is the main component of the "narrow-band" integrated service digital network, solve all of their resource control problems at admission of calls in the network: once a call has been set up, a fixed bit rate resource is reserved for a user. The circuit mode would not of course suit the WB-ISDN network for obvious reasons of under-utilization of the transmission means due to the highly sporadic nature of certain communications.

Conversely, the ATM technique is based upon packet mode communications and therefore on operation in queues. Nevertheless, contrary to the techniques usually used for congestion control in conventional packet networks, an oversizing of the network or a step-by-step control of the traffic between nodes of the network is inconceivable for a wide-band network in which the bit rates can reach a hundred Mb/s. The control mechanisms substantially penalize the transmission times and prove inefficient. A solution consists in posing the problem backwards: if the congestion of the network cannot be controlled (deterioration of transmission times), it must be avoided by means of resource allocating mechanisms when accesses to the network are requested. But this prior condition imposes evaluation of the resource to be reserved as a function of the service: it is as easy to determine a resource to be reserved for a request for a constant or variable bit rate service, as it is difficult to define a resource to be reserved for highly-sporadicalness services.

When a source-user transmits a connection request, the request must contain the address of the destination but also the capacity required to route a traffic associated with the request. This request is routed within the network, from one node to another, according to routes determined by a routing algorithm. The call is accepted if there exists at least one route between the source-user and the destination such that each internodal link of said route has sufficient capacity to satisfy the transmission capacity required by the user. The problem has been stated: what bit rate capacity has to be required to route traffics having highly sporadic flows?

The complete generalization of the capacity of the network makes it difficult to provide an answer, insofar as the connections interact with one another.

Modification of the existing telephone network infrastructure to produce a wide-band digital network cannot be envisaged in the medium-term. These reasons are notably based on financial considerations, the means to be implemented to install a terrestrial wide-band digital network being considerable. In order to get around this limitation, a more flexible and less costly natural solution consists in using satellite wide-band networks. Nevertheless, the problem of resource control remains set in equivalent terms, in this case for access to a satellite channel.

The time-division share of a satellite channel between plural stations has been mainly envisaged according to two techniques:

the random technique aimed at generalizing the resources but consequently entailing fluctuations in the cell transmission delay far in excess of the limits specified for conversational services such as the telephone service, and the access-by-reservation technique.

Figure 2:
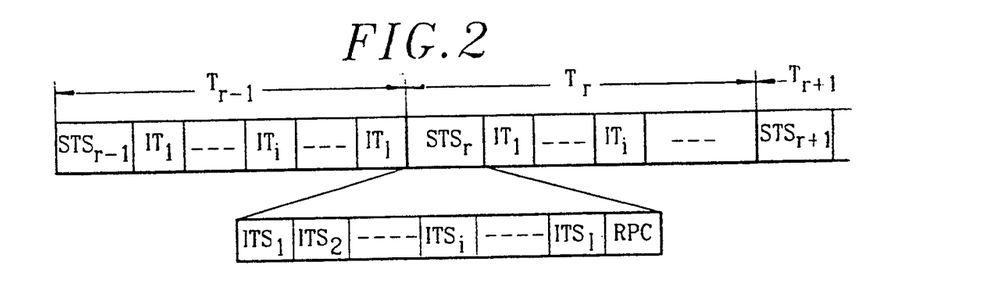
FIG. 2 shows a frame format used in the TDMA reservation protocol according to the prior art and using the TDMA (Time Division Multiple Access) mode.

According to the latter technique, contrary to the random access technique in which a connection implicitly entails a "creation" of a time interval by synchronization, frames are periodically allocated to the communications. A frame format based on the TDMA principle and used in the TDMA-reservation protocol is shown in FIG. 2. A frame $T_r$ is divided into a data sub-frame $STD_r$ and a signalling sub-frame $STS_r$. The sub-frames $STD_r$ and $STS_r$ are respectively allocated to the transmission of data and the transmission of resource allocation request/response messages.

According to certain embodiments, the sub-frame $STS_r$ has a length that is variable as a function of the bit rate. For an earth station $ST_i$ sending a resource allocation request, the TDMA reservation protocol consist in the transmission of a reservation message in an assigned interval $ITS_i$ of a signalling sub-frame $STS_r$ after complete reception of a burst of cells generated by a service of a sporadic nature of a user station. A central station SC, receiving all the reservation messages coming from earth stations, allocates the required capacity to the earth station $ST_i$ when sufficient transmission capacity is available. This TDMA-reservation protocol advantageously informs the central station SC by means of the signalling sub-frame STS, with regard to a precise allocation request since the earth station only forwards its request after complete reception of the burst, and therefore after taking the length of the latter into account. Nevertheless, this "store and forward" management which consists in storing the whole burst of cells before processing an allocation request, is not satisfactory for services introducing very long bursts since such a management induces transmission delays which are unacceptable for certain services (interrogation of image data bases).

OBJECTS OF THE INVENTION

The main object of this invention is to remedy the preceding disadvantages. Another object of this invention is to provide a method for reducing the time required to allocate a resource, by transmitting a resource allocation request in the signalling sub-frame for a burst of a sporadic connection well before this burst has been completely received by the earth station. For each burst of the connection, a resource allocation request is then transmitted by an earth station to the central station prior to complete reception in the earth station of said burst. As no information on the lengths of the bursts of the connection can then be transmitted respectively in the allocation requests, another object of this invention is to provide an algorithm selectively enabling the setting up of a connection to be accepted or refused. After acceptance of the connection, the resource allocation requests relating to the bursts of this connection are then successively satisfied, irrespective of traffic.

SUMMARY OF THE INVENTION

Accordingly, a method for allocating resources to earth stations by a central station in a satellite asynchronous time-division telecommunication network, the earth stations receiving bursts of data cells transmitted by user stations during respective sporadic connections, said bursts being transmitted in a data sub-frame of a time-division multiple access periodic frame, a sporadic connection being defined by an average length of the bursts to be transmitted during said connection, a sporadicness and a maximum bit rate, an earth station having completely received a burst transmitting an end message which includes the length of the burst, in a signalling sub-frame of the periodic frame to the central station so as to release a resource allocated to the burst in the data sub-frame when the whole burst has been transmitted by the earth station, is characterized by the decision to accept or refuse a given sporadic connection to be set up subsequent to a sporadic connection request in the signalling sub-frame by an earth station, the decision being determined as a function of an algorithm in which the average lengths of the bursts and sporadicnesses are considered as predetermined constants and which depends on maximum bit rates and average bit rates of the connections in process and of said given connection, the maximum bit rate and said average bit rate relating to said given sporadic connection being included in the connection request, subsequent to acceptance of the sporadic connection request, the transmission of a resource allocation request in the signalling sub-frame from the earth station to the central station in response to the beginning of the reception and storing of each of the bursts of the given connection in the earth station, and the anticipated reservation of a resource in the form of a time interval in the data sub-frame for the burst by the central station as soon as a time interval of the data sub-frame is released so that the earth station can begin transmitting the burst while continuing to store the burst.

According to a feature of the invention, the algorithm consists, for said sporadic connection request, in computing an equivalent load ratio $RA_{eq}$ for the bursty connections in process and for said given connection as a function notably of said constants and of the maximum bit rates of the sporadic connections, in computing the sum of the average bit rates of the sporadic connections, in computing the product of said sum by said equivalent load ratio, and in accepting the connection request when said product is lower than a total capacity available for the bursty connections.

The invention also provides for connections with constant bit rate to be set up between the user stations in the network. The algorithm for a constant bit rate connection then consists in subtracting the constant bit rate from the total available capacity thereby establishing a second capacity available for the sporadic connections, in computing said product for sporadic connections in process, and in accepting the constant bit rate connection request when said product is lower than the second available capacity.

BRIEF DESCRIPTION OF THE DRAWINGS

Further advantages and features of the present invention will be apparent more clearly from the reading of the following description of a preferred embodiment of the invention with reference to the corresponding accompanying drawings in which.

DESCRIPTION OF THE PREFERRED EMBODIMENTS

In a first part of the description hereinunder, the interest of the method embodying the invention is presented comparatively to the known TDMA reservation protocol concerning the emission by each earth station of a resource allocation request for each received burst. This comparison could be extended to any type of known protocol using a resource reservation mode which is not anticipated.

A second part of the description deals with an algorithm according to the invention, carried out in a central station and enabling determination of whether or not a connection request should be accepted. Indeed, according to the invention, resource allocation requests for the bursts transmitted during a connection are independent of the features of said bursts and must therefore be satisfied.

A particular embodiment of the invention is described in the following part of the description and concerns a two-beam satellite network architecture. It will naturally be appreciated by those skilled in the art that modifications can be introduced within the scope of the invention. For instance, the invention can apply to a single-beam architecture or an architecture comprising any number of satellite network beams.

Figure 1A:
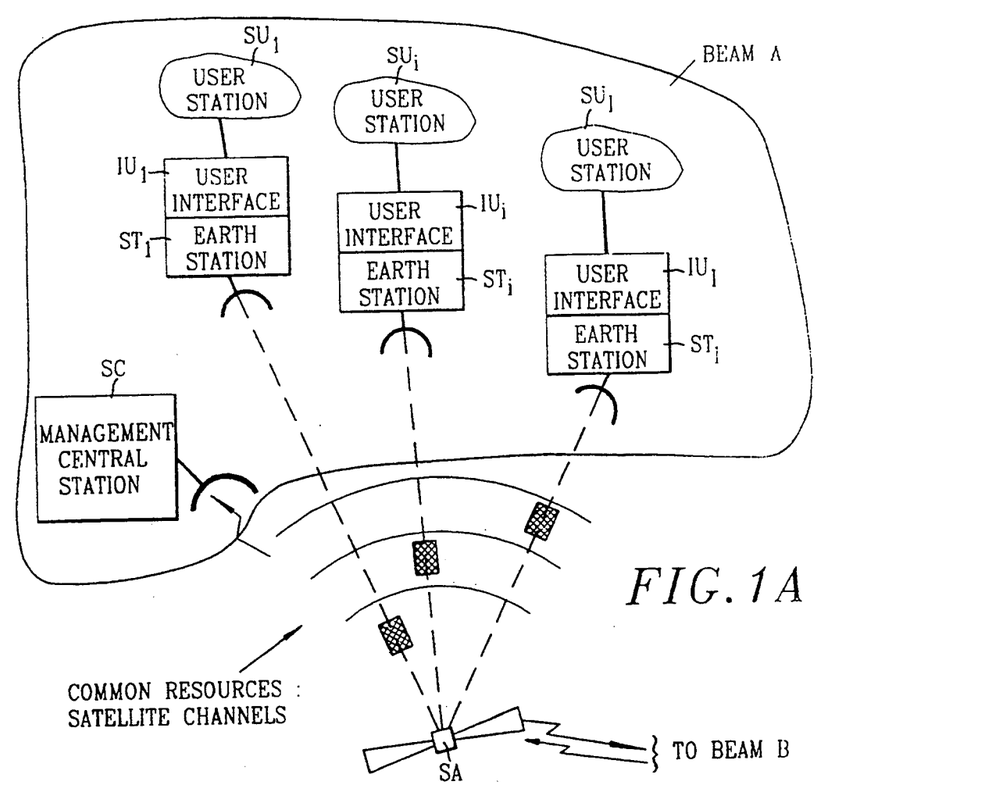
FIGS. 1A and 1B respectively show a satellite wideband network and a time chart of a sporadic communication in this network.

FIG. 1A schematically shows a two-beam wide-band digital network architecture. The network sets up communications between a group of first user stations $SU_1$, ... $SU_i$, ... $SU_I$ in a first beam A, and a group of second user stations in a second beam B (not shown) via a satellite, e.g. in the context of intercontinental communications. The wording "user station" arbitrarily designates a user station or terminal, or a local area network to which a plurality of user stations is connected. The user stations $SU_i$, i being an integer lying between 1 and I, are connected to respective earth stations $ST_i$, via user interfaces $IU_i$.

The earth stations further performs modulation and encoding functions on the information transmitted from the different user stations for retransmission to satellite SA. A management central station SC ensures instantaneous management of the common resource: at least one carrier frequency satellite channel, the monitoring and controlling of the different earth stations $ST_1$ à $ST_I$, and the setting up and release of the connections as will be seen hereinafter. In beam B (not shown), a control station performs a function referred to as "echo" function; this "echo" function consists mainly in retransmitting to the opposite beam, in this instance beam A, the signalling sub-frame received from this opposite beam into TDMA-format frames. Notably, this "echo" function contributes to the retransmission of connection request messages and resource allocation request messages, transmitted by the earth stations in the signalling sub-frame, to the satellite station SC, which ensures connection acceptance decisions. As previously stated, the wide-band digital technique prohibits a control of the flows between links by conventional methods. Resource allocation mechanisms must be carried out precisely before an access to the resources. It is the role of the central station SC to manage all the connection requests made by the earth stations $ST_i$ for satisfying the resource allocation mechanism embodying the invention.

Subsequent to acceptance of a connection by the central station SC to an earth station $ST_i$, bursts of the connection are transmitted between the earth station $ST_i$ and any other station of beam B via the satellite SA.

Figure 1B:
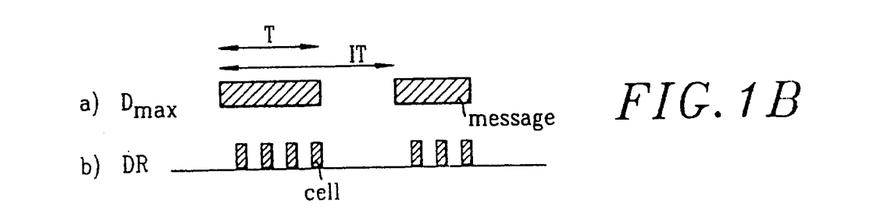

As shown in FIG. 1B, the different sporadic services integrated in the different user stations of the "wideband" digital network generate, during respective connections, messages with variable lengths T (line a), the lengths being expressed in numbers of bits. The messages transit in the network in the form of ATM cells (line b) previously defined. These different digital services constitute sporadic traffic sources which are characterized by relatively long time intervals IT between successive messages of which the bits are generated at a maximal bit rate $D_{max}$. The following three parameters define the traffic of a source:

the average bit rate of message generation $D_{moy}=T_m/IT_m$, where $T_m$ and $IT_m$ denote the average length of a message and the average interval separating two messages, the sporadicness SP of the service of the source $SP=D_{max}/D_{moy}$, and the average length of the bursts expressed in numbers of cells.

As shown on line b of FIG. 1B, the different messages generated by a digital service (line a) are transmitted in the digital network in the form of ATM cells according to the established standard. The word "burst" used hereinafter designates a set of cells in ATM format resulting from the segmentation of a service message with sporadic nature into cells transmitted at the rate of the network DR greater than $D_{max}$.

For the purposes of simplification, only methods (or protocols) for allocating resources to earth stations $ST_1$, ... $ST_i$, ... $ST_I$ by the central station SC are described, without taking into account all the functions defined in the reference model of the ATM protocol, such as segmentation of messages into bursts, alignment of the cells transmitted by the various user stations of a group and received by the respective earth stations of this group, modulation, etc. The methods (or protocols) defined throughout the description must therefore be considered as "layers" in a more general model of interconnection via satellite.

The connections set up between the earth stations of the two beams are of two types as a function of the nature of the services:

constant rate connections corresponding to "circuit-mode" communications and thus characterized by "continuous" streams of ATM cells, and connections of a sporadic nature defined by cell streams spaced by relatively long time intervals.

Figure 3:
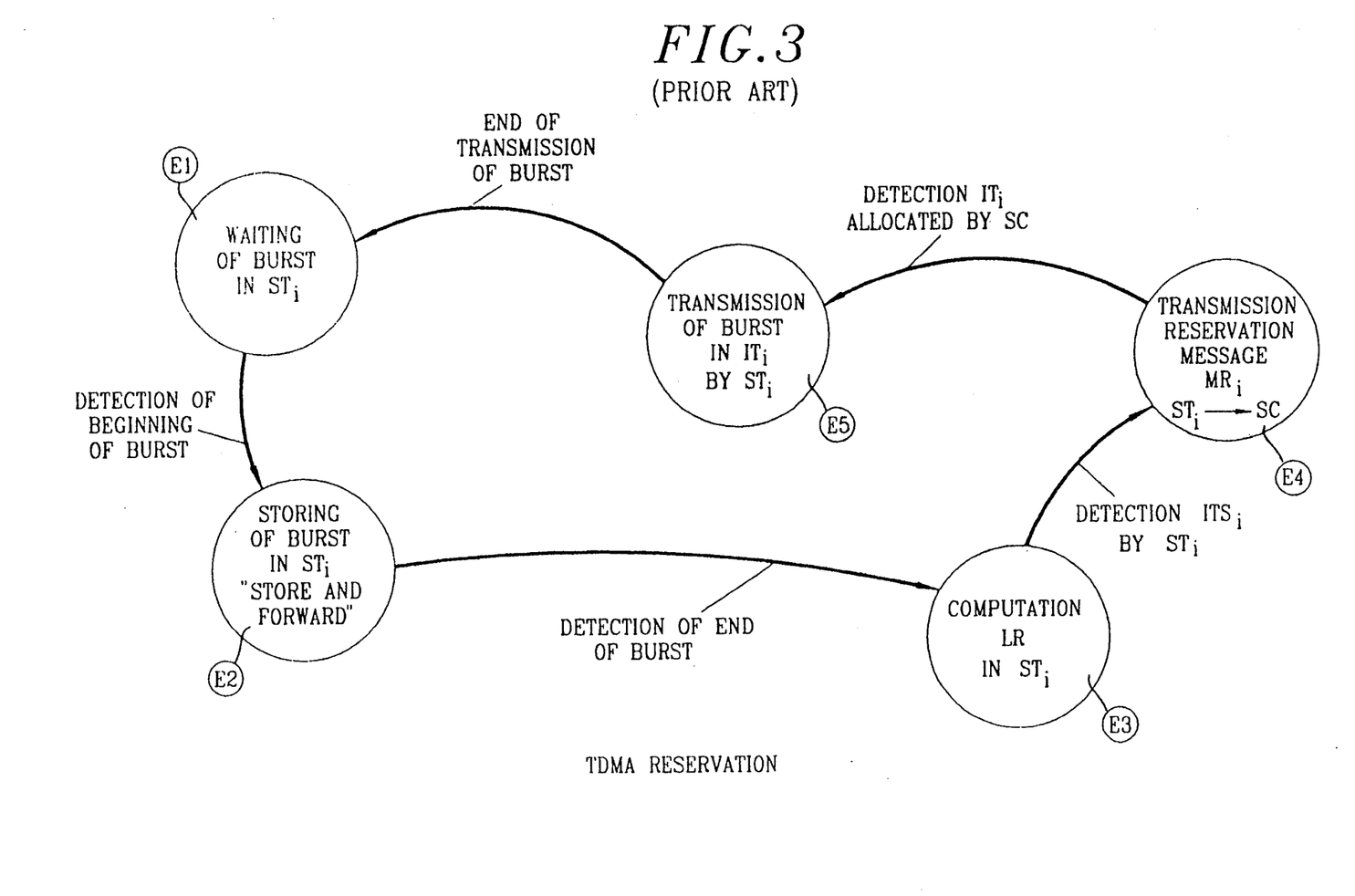
FIG. 3 is a state diagram according to the TDMA reservation protocol.

In reference to FIG. 3, a diagram of states E1 to E5 for an earth station $ST_i$ setting up connections via the satellite SA throughout the central station SC, relates to the TDMA-reservation protocol, a protocol for allocating resources burst by burst. This known protocol is used for dynamic allocation of resources by the central station SC to the various earth stations in order to set up communications via the satellite SA. In addition, the central station SC manages the resource allocations attributed to the various earth stations $ST_i$ for connections to be set up via the satellite SA.

In a first state E1, the earth station $ST_i$ is awaiting a burst. As previously stated, this means the station $ST_i$ is awaiting reception of a message burst produced by one of the sporadic connections set up by this station $ST_i$ (FIG. 1A). Once the beginning of the burst is detected, the earth station $ST_i$ is in a second state E2 for storing the burst. This storing is carried out according to the "store and forward" mechanism, meaning that no action is undertaken by the earth station $ST_i$ before the burst is completely stored. After detection of the end of the burst, the earth station $ST_i$ computes the length of the burst LR expressed in numbers of cells received (state E3), the cells having a constant length expressed in number of bits. After computation of the length of the burst, corresponding to a given resource needed by the earth station $ST_i$ for transmitting the burst via the satellite SA, the station $ST_i$ is awaiting a signalling time interval $ITS_i$ which is attributed to it in the TDMA-format frame shown in FIG. 2 (state E4).

In a reservation message $MR_i$ transmitted in the time interval $ITS_i$ attributed to it, the earth station $ST_i$ transmits a resource reservation request accompanied by an information concerning the length of the burst LR to be transmitted. A resource allocation device in the central station SC receives the reservation message $MR_i$ by echo retransmission from a terminal of beam B. This allocation device manages different reservation requests transmitted by means of respective reservation messages $MR_1, \ldots MR_I$ by the different earth stations $ST_1, \ldots ST_I$ so as to allocate resources. Subsequent to reception by the central station SC of the reservation message $MR_i$ transmitted by the earth station $ST_i$, the allocation device of the central station SC attributes resources to the earth station $ST_i$ upon expiry of a waiting time Ta which is a function of the network traffic. This attribution of resources corresponds to an allocation of a time interval $IT_i$ in a data sub-frame $STD_i$ to the earth station $ST_i$ by the central station SC. The length of the time interval $IT_i$ assigned to the earth station $ST_i$ is directly proportional to the length of the burst transmitted in the reservation message $MR_i$. Thus, for a duration which is a function of the length LR of the burst, a resource (state E5) is attributed to the earth station $ST_i$ so that the latter transmits the whole burst received, in the form of ATM cells. At the end of transmission of the burst by the earth station $ST_i$ corresponding to a release of resources, or of a time interval $IT_i$ by the central station SC, the station $ST_i$ returns to the first state E1 awaiting the next burst.

The drawbacks of using the TDMA reservation protocol in a wide-band digital network result from two antagonistic considerations for transmissions of bursts of long duration:
 the "response times" of the network must be very short to provide users with a good level of quality of services in fields as varied as image, real-time interrogation of data bases, etc.
 the asynchronous time-division technique is primarily a packet-mode technique based on queue management.

However, as shown in the state diagram in FIG. 3, a resource allocation request from an earth station $ST_i$ to the central station SC by means of a reservation message $MR_i$ is only made subsequent to complete storing of the burst, for a transmission of this burst to the destination earth station. The resource allocation device in the central station SC therefore only receives the reservation message subsequent to a delay $T_1$ such that $T_1 = TR + 2T_t$, where TR is the duration of the burst and $2T_t$ is the time of forward and return transmission of the reservation message between the earth station $ST_i$ and the central station SC (ground-satellite-ground-satellite-ground). The reservation message is then stored in a FIFO queue of the allocation device of the central station SC thereby processing the message after a waiting time Ta. In this way, a resource, i.e., in practice a time interval $IT_i$ of a data sub-frame $STD_j$, is only attributed to the earth station $ST_i$ by the central station SC upon expiry of a duration $T_2$ such that $T_2 = TR + 2T_t + Ta$.

The "forward and return" transmission time $2T_t$ and the waiting time Ta are difficult to modify since they depend on intrinsic features of the network according to the embodiment selected (capacity, lines, layout). Conversely, the duration of the burst TR induces critical delays when the burst or the message from which it comes, is of long duration (image services).

Figure 4:
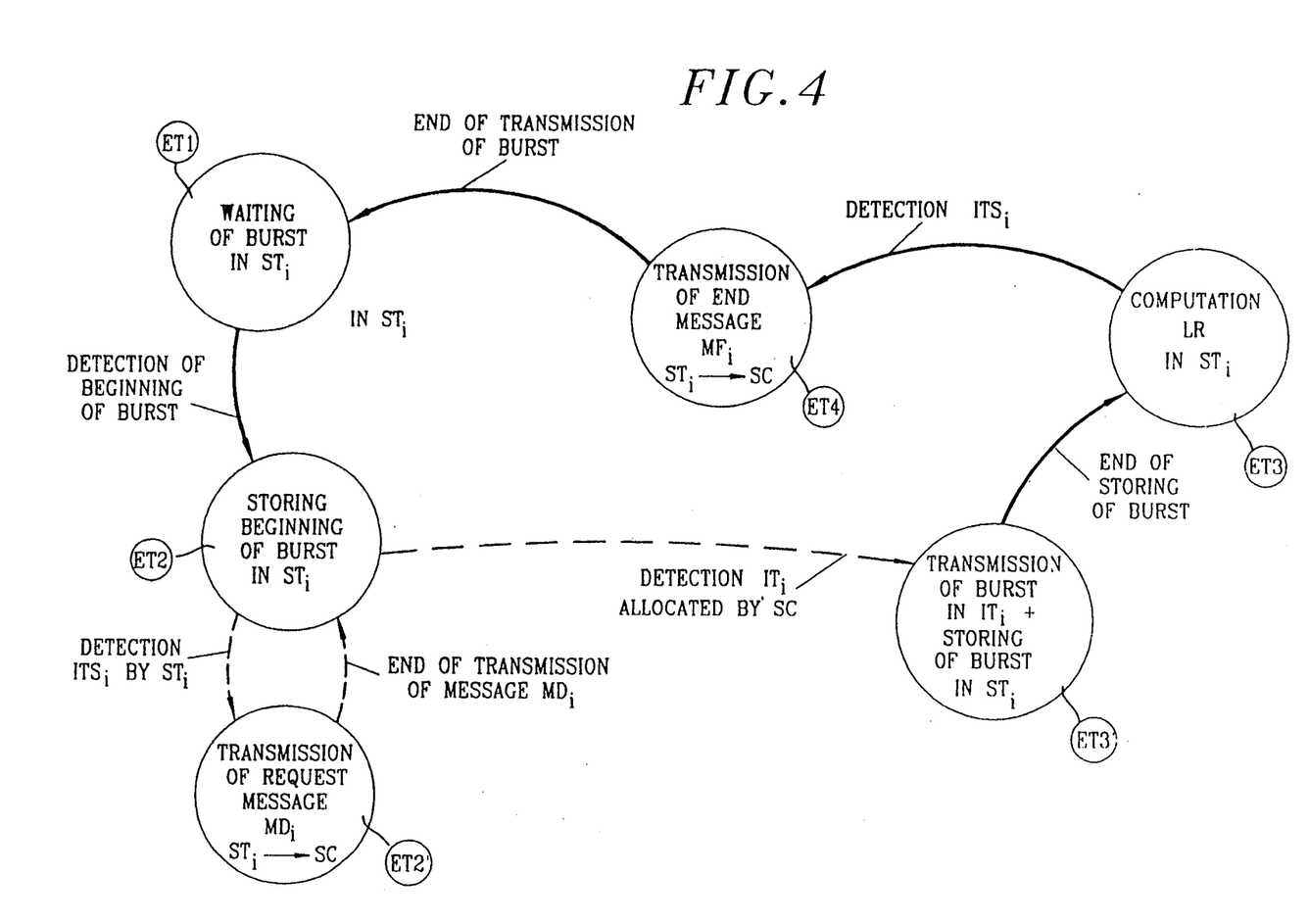
FIG. 4 is a state diagram of the resource allocation method embodying the invention.

The method embodying the invention aims mainly to reduce resource allocation delays, as indicated in the diagram of states ET1, ET2–ET2', ET3'–ET3 and ET4 shown in FIG. 4. Initially in a first state ET1, the earth station $ST_i$ is awaiting a burst. Upon detection of the beginning of a burst generated during a connection set up by the earth station $ST_i$, i.e., of a first cell in the burst, the earth station $ST_i$ moves to a second state ET2 to begin storing the burst. However, contrary to the TDMA reservation protocol, in this storing state ET2, the earth station $ST_i$ is awaiting a signalling time interval $ITS_i$ which is specific to it in the signalling sub-frames $STS_r$. Upon detection of a time interval $ITS_i$ following the start of storage of the burst, the earth station $ST_i$ transmits in the latter an allocation request message $MD_i$ towards the central station SC (state ET2'). This allocation request message $MD_i$ received by the central station SC is stored in a FIFO memory of the resource allocation device. All the messages $MD_1$ to $MD_I$ coming from the earth stations $ST_1$ to $ST_I$ and relating to resource allocation requests are thus processed according to their order of arrival by the allocation device; this device successively processes the different resource allocation requests stored in the queue and attributes resources, materialized by periodic time intervals $IT_i$ to the various corresponding remote earth stations as a function of the available resource capacity.

In this way, contrary to the TDMA reservation protocol in which a reservation message $MR_i$ is only transmitted by an earth station $ST_i$ subsequent to complete reception of a burst, the method embodying the invention provides transmission of an allocation request message $MD_i$ by the earth station $ST_i$ to the central station SC immediately upon detection of the beginning of the burst.

After detection of a time interval $IT_i$ in the data sub-frame assigned to the earth station $ST_i$ by the central station SC, subsequent to processing of the allocation request message $MD_i$, the earth station $ST_i$ begins transmission of the burst in the interval $IT_i$. After complete storing of a burst, the earth station $ST_i$ computes, in state ET3, the length LR or duration TR of the burst stored. An information concerning the length of the burst is then transmitted in an end message $MF_i$ from the earth station $ST_i$ to the central station SC after detection of a signalling time interval $ITS_i$ as indicated in state ET4 of FIG. 4. The end message $MF_i$ notably enables the central station SC to be informed about the length of the burst so as to release the assigned interval $IT_i$ when the whole burst has been transmitted by the earth station via the satellite.

Figure 5A:
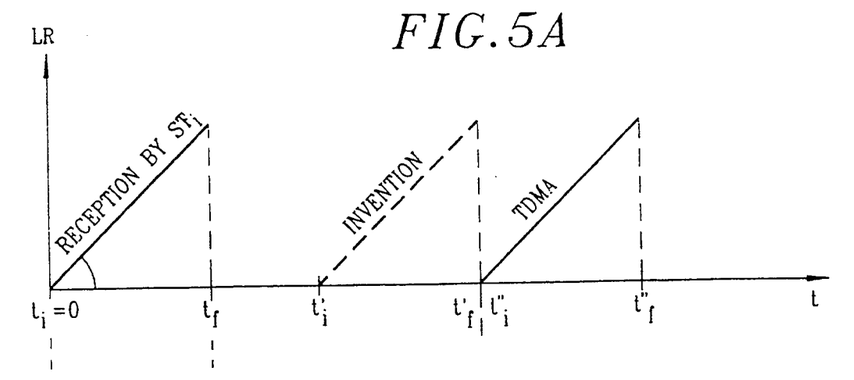
FIGS. 5A, 5B and 5C are time charts of signal exchanges for the purposes of comparison between the TDMA reservation protocol and the method embodying the invention.
Figure 5B:
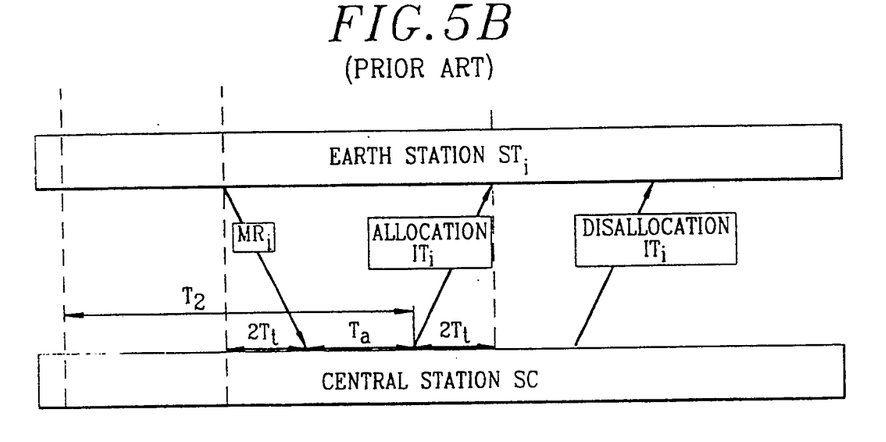
Figure 5C:
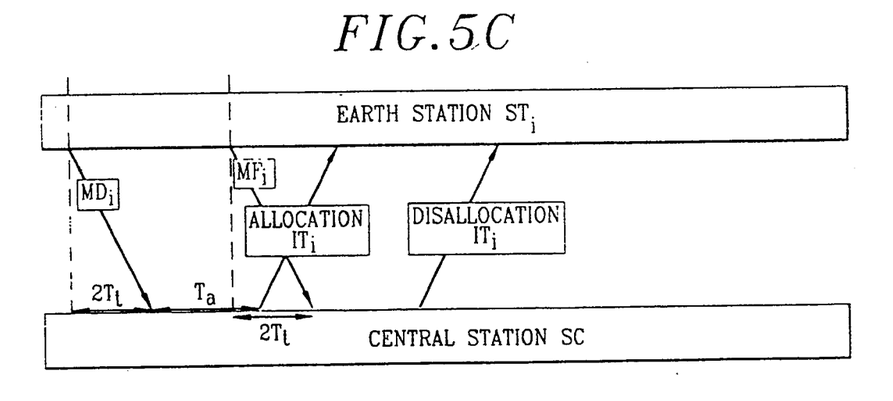

To compare the performances of the method embodying the invention with regard to the known TDMA reservation protocol, reference is made to FIGS. 5A, 5B and 5C which schematically illustrate exchanges of signals during a communication or connection being set up between an earth station $ST_i$ and the central station SC and consisting in transmission of a burst.

FIG. 5A shows lengths LR of bursts transmitted as a function of the time t. Initial instants $t_i$ and final instants $t_f$ delimit in an earth station $ST_i$ the storing of a burst transmitted by a user station at a bit rate $D_{max}$. Instants $t'_i$ and $t'_f$ and instants $t''_i$ and $t''_f$ temporally delimit the transmission of the burst from the earth station $ST_i$ to any station of beam B by respectively using the method embodying the invention and the TDMA-reservation protocol.

FIGS. 5B and 5C schematically show transmission phases of a burst between the earth station $ST_i$ and the central station SC respectively according to the above-mentioned protocol and according to the method embodying the invention.

In FIG. 5B, relating to the TDMA reservation protocol, the earth station $ST_i$ only transmits a reservation message $MR_i$ subsequent to complete storing of the burst according to the "store and forward" mechanism.

This reservation message $MR_i$ received by the central station SC after a transmission delay $2T_t$ is only processed by the latter after a waiting time Ta corresponding to a processing time of reservation message $MR_i$ stored in a queue of the resource allocation device of the central station SC. The allocation of resources by the central station SC corresponds to the allocation of a time interval $IT_i$ in the data sub-frame $STD_j$ in the earth station $ST_i$ as a function of a burst length information included in the reservation message $MR_i$ and precedes transmission of the burst from the earth station during a time $(t''_f - t''_i)$.

In FIG. 5C, relating to the method embodying the invention, an allocation request message $MD_i$ is transmitted by the earth station $ST_i$ to the central station SC subsequent to a beginning of detection of a burst after detection of a signalling time interval $ITS_j$. As will be seen further on a bit rate $D_{max}{}^i$ is then attributed to the earth station $ST_i$ by the central station SC, also after a waiting time Ta. Nevertheless, as the message $MD_i$ is transmitted immediately upon reception of a first cell of the burst by the earth station $ST_i$, the gains in transmission time, especially for bursts of long duration, are considerable.

Figure 6:
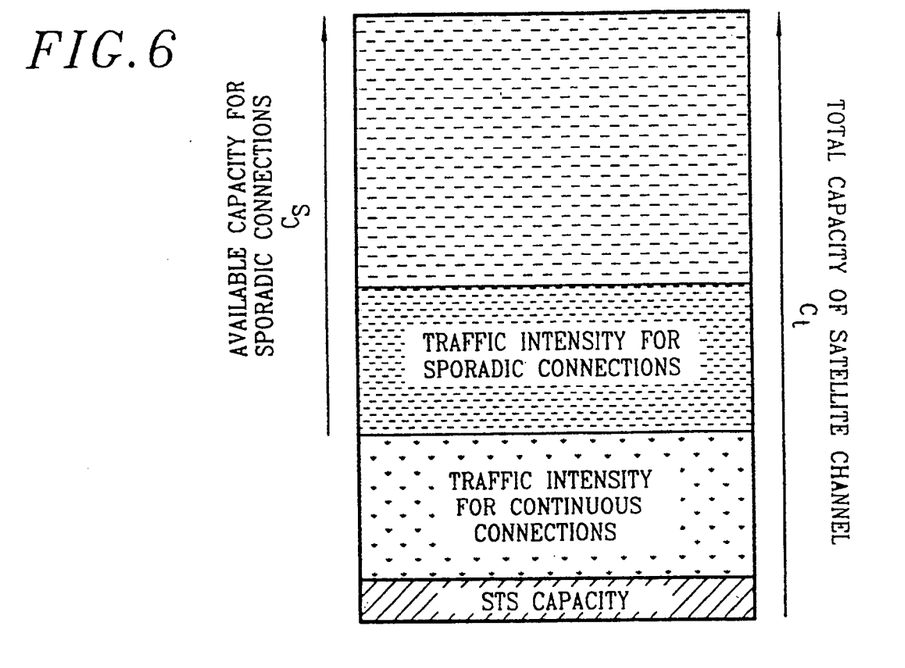
FIG. 6 is a chart of the distribution of traffic in a wide-band digital network.

In reference to FIG. 6 which summarizes the traffic load capacity attributions in the satellite channel, one part of the total capacity $C_t$ of the satellite channel is attributed to the signalling sub-frame STS, whereas two other parts are respectively attributed to the continuous connections and to the sporadic connections set up between earth stations of beams A and B and are included in the data sub-frame STD. The useful part attributed to these sporadic connections is very variable, whereas the part attributed to the continuous connections, i.e. having constant bit rates, varies more slowly. In fact, the time interval $IT_i$ allocated to a continuous connection subsequent to a single connection and allocation request has a constant length and is periodic.

The first part of the description showing the principle of the method embodying the invention by comparison with the TDMA-reservation protocol clearly establishes that any resource allocation requests for each burst transmitted by an earth station $ST_i$ must be satisfied as no information concerning the capacity required for a received burst is transmitted during an allocation request. In that case, no connection for a transmission of bursts can be accepted without a risk of overloading of the network and slumping of the performances of the network. It is then necessary to establish an algorithm for elaborating refusal/acceptance of the connections or communications. This algorithm will now be presented in the second part of the description.

From the point of view of sporadic traffic, it will be supposed that at a given instant, I earth station $ST_1$ to $ST_I$ of the beam have each set up a connection $COM_1$ to $COM_I$, though in practice an earth station sets up several connections respectively for plural terminals of a user station which is connected to it. The configuration of the network is entirely defined by I groups of three parameters respectively relating to the I connections $COM_1$ to $COM_I$ set up between beams A and B and by a global parameter of the network which is the total available capacity attributed to the bursty connections $C_S$. The three respective parameters relating to each $COM_i$ of the connections set up are:

the average length $Lm_i$ of the bursts respectively generated by the earth station $ST_i$ during a connection, the length being expressed in number of cells, the sporadicness $SP_i$ of the bursts of the connection, and the load ratio $RA_i$ between the available capacity $C_S$ and the available bit rate $D_{max}{}^i$ generated by each station, the capacity being expressed in bit/s.

Figure 7:
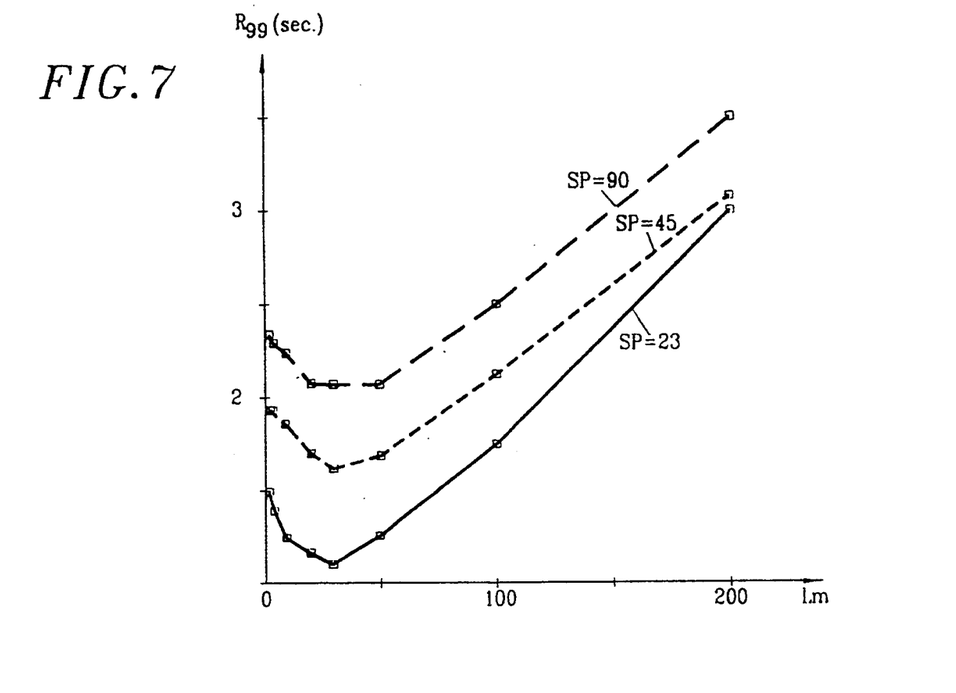
FIGS. 7, 8 and 9 are diagrams for an elaboration of an acceptance/refusal algorithm of a connection for carrying out the method embodying the invention.
Figure 8:
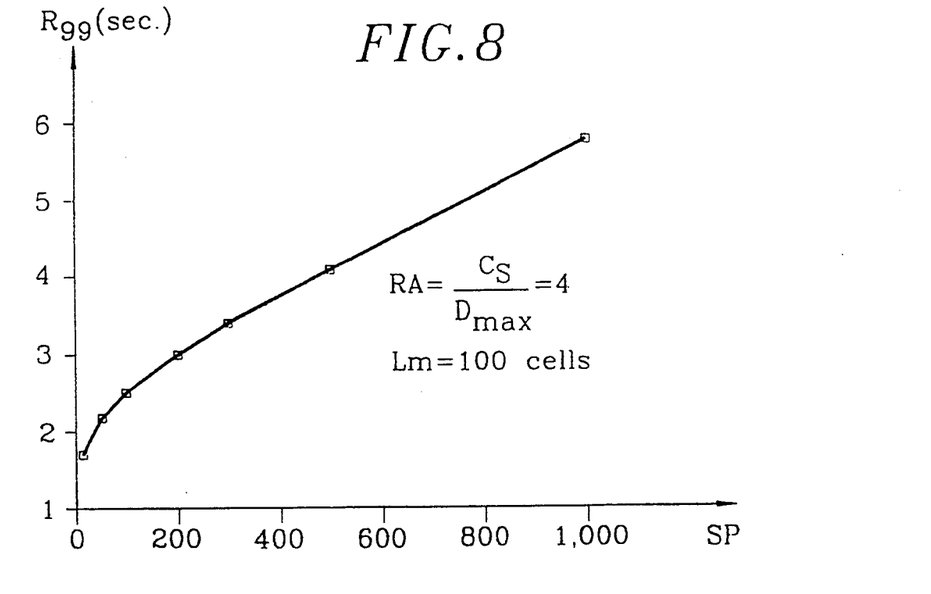
Figure 9:
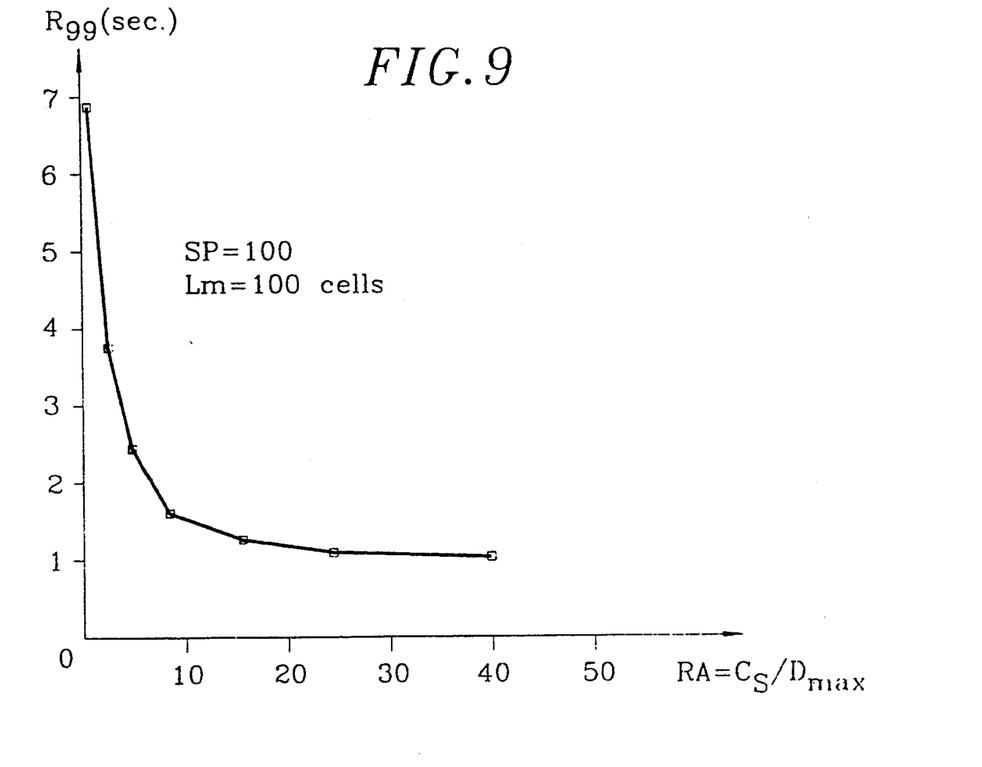

All the curves presented in FIGS. 7, 8 and 9 have been obtained by simulating the behaviour of an integrated services digital satellite network using the asynchronous time-division technique (ATM). The simulation tool is a computer programmed in SIMSCRIPT language. It is notably presupposed in the simulation carried out that the signalling sub-frame STS represents at least 5% of the total frame of duration 30 ms and that the ground-satellite-ground transmission delay is 300 ms. The performances of the resource network using the resource allocation mode characterizing the invention and presented in the first part of the description, are measured in terms of delay (in seconds) between the beginning of reception of a burst in a given earth station and the retransmission of the received burst to any station of beam B. In this study, the three previously defined parameters characterizing connections respectively set up between the different earth stations $ST_i$ of beam A and stations of beam B are presumed to be identical; this is a homogeneous connection configuration. Thus, the "simulated" connections between the various stations are characterized by burst average lengths Lm, sporadicnesses SP and load ratios RA which are respectively identical. The action of each of the parameters on the performance of the network in terms of delay is thus studied.

In FIG. 7 is shown the influence of the average length Lm of the bursts, presupposed identical for each of the connections set up between the earth station $ST_i$ of beam A and stations of beam B via the central station SC, on the transmission delay $R_{99}$ expressed in seconds. This transmission delay $R_{99}$ must be perceived as an average statistical result and more precisely must be analyzed as a 99% probability of obtaining a real delay lower than $R_{99}$.

In FIG. 7, the load ratio $C_S/D_{max}$ is presupposed equal to 4, and different curves are represented for sporadicnesses respectively equal to 23, 45 and 90. For short bursts (less than 50 cells), an increase of the average length Lm of the bursts entails a decrease of the transmission delay $R_{99}$. This phenomenon is in accordance with the resource allocation principle embodying the invention. Indeed, for short bursts transmitted by the various earth stations $ST_i$ during respective connections, the transmission delays of the end-of-storing messages $MF_i$ transmitted to the central station SC and containing an information relating to the resource allocation duration for the resource allocation device in the central station SC are all the more important when the bursts are short. A part of the resources of the satellite channel is then attributed to an earth station during a relatively long period of time by comparison with an effective transmission of bursts. With the exception of this phenomenon, for bursts of over 50 cells, an increase of the average length of bursts entails an increase of the transmission delay $R_{99}$.

FIG. 8 illustrates the effects of the sporadicness of the connections set up between the various earth stations of the first beam A and the stations of beam B via the central station SC on the transmission delay $R_{99}$.

The curve shown in FIG. 8 was also obtained by simulating a homogeneous configuration in which the three parameters defining each connection are identical. It should be noted that an increase of the sporadicness of the connections entails an increase of the delay $R_{99}$.

FIG. 9 shows the effect of an increase of the load ratio $C_S/D_{max}$ on the transmission delay $R_{99}$. The performance of the method embodying the invention is improved when the capacity available $C_S$ for the sporadic connections $C_S$ increases in relation to the maximum bit rate $D_{max}^i$ of the bursty connections.

Study of the performances of a "homogeneous" configuration such as described in reference to FIGS. 7, 8 and 9 is too far removed from real operating conditions to conceive the final layout of the method embodying the invention within the framework of a "wide-band" integrated service digital network in which numerous digital services coexist and are characterized by connections that have not identical parameter values (Sporadic nature, Average length of bursts, Allocation ratio). A more general study is needed for the purposes of deducing a layout of a method for elaborating refusal or acceptance of a connection. The connections are studied in the context of heterogeneous connections coexisting in the network and characterized by parameters that can take on different values. The study of this heterogeneous configuration must not simultaneously deal with the three parameters characterizing the various connections set up between the earth stations of beam A and the stations of beam B. Each of the parameters must be studied separately in order to deduce the effect of heterogeneousness on each of these.

The possible values of the various parameters studied in this simulation concern the three above-mentioned parameters.

Figure 10:
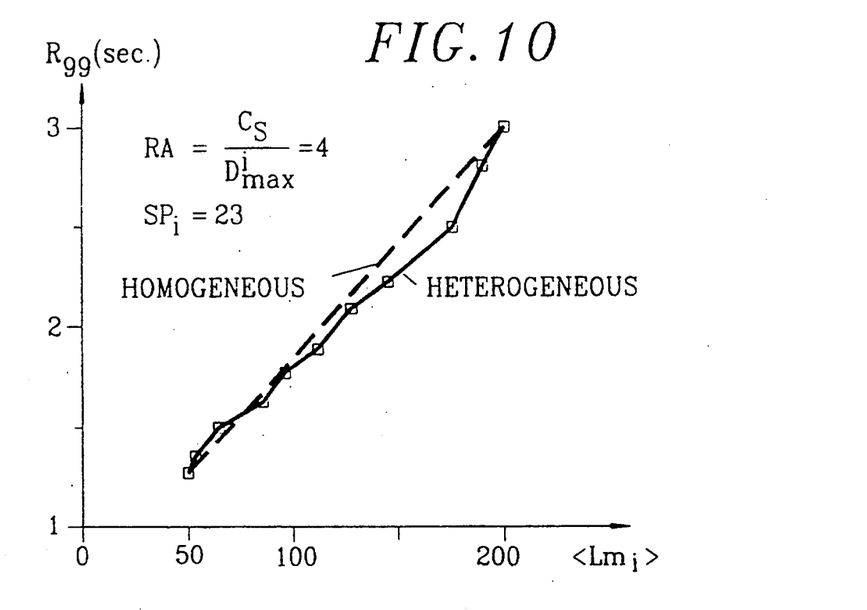
FIGS. 10 and 11 are diagrams for explaining parameter equivalences according to the method embodying the invention.
Figure 11:
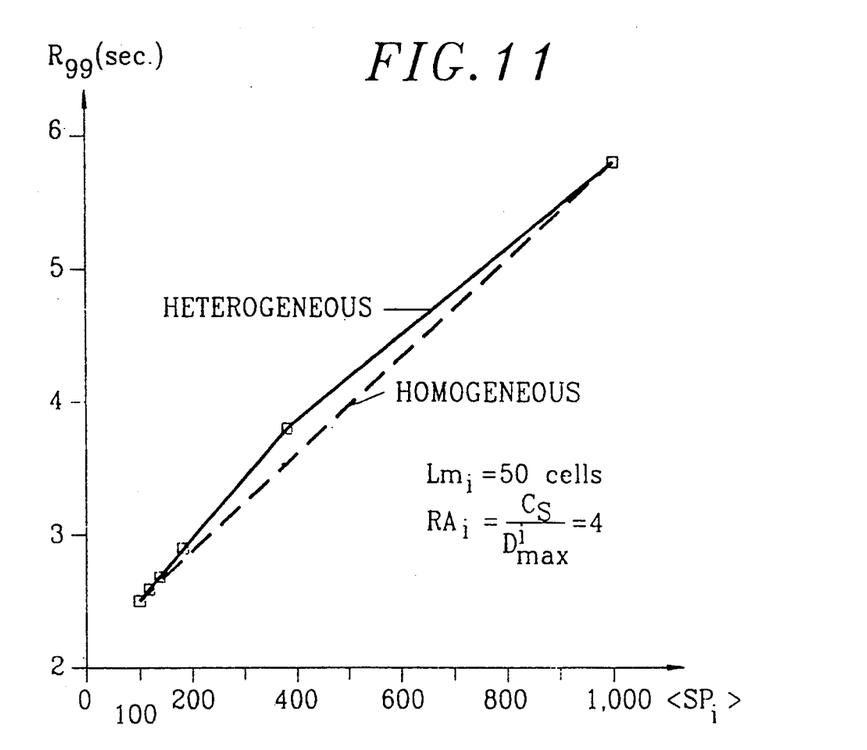

FIGS. 10 and 11 contribute respectively to the study of the effect of the heterogeneousness on two parameters, average length of the bursts $Lm_i$ and sporadicness $SP_i$, the two other respective parameters RA and SP, or Lm and RA being presupposed to be homogeneous.

FIG. 10 relates to a simulation of k connections respectively set up by the earth stations via the central station SC, k being e.g. equal to 50. In this simulation, it is presupposed that the connections between earth stations of beam A and stations of beam B are of two types, representative of respective digital telecommunication services. All the communications have a same sporadicness $SP_i$ equal to 23 and a same allocation ratio $RA_i = C_S/D^i_{max}$ equal to 4.

The "simulated" connections are only differentiated by different values, two in number, of their respective average burst length $Lm_i$. The two possible values of the burst lengths are equal to 50 and 200 cells for the purposes of simplifying the simulation. The X-axis in FIG. 10 relates to an arithmetical average $$<Lm_i> = \left(\sum_{i=1}^{k} Lm_i\right)/k$$

of the lengths of bursts of the I respective connections. A first curve in continuous lines shows the transmission delay $R_{99}$ of the communications as a function of the arithmetical average $<Lm_i>$ of the respective burst lengths of the k connections. The k connections are thus simulated with burst lengths equal to 50 and 200 cells, which corresponds to an arithmetical average varying between a minimum average for which all the connections are constituted of bursts equal to 50 cells and a maximum average for which all the connections are defined by burst lengths equal to 200 cells. A curve in broken lines is obtained by a simulation of k connections for which the average lengths of the respective bursts $Lm_i$ are identical and equal to the average of the average lengths $<Lm_i>$ of the bursts for the k connections in the heterogeneous model.

In FIG. 10, the two curves obtained for the two simulations are very close, which means that for the resource allocation method embodying the invention, k connections generating different burst lengths $Lm_i$ are equivalent to k connections having identical burst length $L_{eq}$ equal to the average of the different burst lengths $Lm_i$. This corresponds to the following equation:

$$L_{eq} = \left(\sum_{i=1}^{k} Lm_i\right)/k \quad \text{(eq. 1)}$$

FIG. 11 relates to a simulation of k connections respectively set up by k earth stations $ST_i$ via the central station SC. For each "simulated" connection, the length of the generated bursts $Lm_i$ is equal to 50 cells, and the load ration $RA_i = C_S/D_{max}^i$ is equal to 4.

Only the sporadicness values vary from one connection being set up to an other. For the purposes of simplifying the simulation, the number of possible sporadicness values is limited to two: 100 and 1,000. The X-axis of FIG. 11 relates to an arithmetical average of the sporadicness values $<SP_i>$ of the k connections, and the Y-axis relates to the transmission delay $R_{99}$ in seconds.

A first curve in continuous lines shows the transmission delay $R_{99}$ of the connections as a function of the arithmetical average $<SP_i>$ of the sporadicness values of the k connections, which varies between a minimum arithmetical average for which all the connections have sporadicness values equal to 100, and a maximum arithmetical average for which the sporadicness values of the k connections are equal to 1,000. A curve in broken lines is obtained by simulation of k homogeneous connections between earth stations $ST_i$ of beam A and stations of beam B via the central station SC for which the respective sporadicness values are identical and equal to:

$$SP_{eq} = k/\sum_{i=1}^{k} (1/SP_i) \quad \text{(eq. 2)}$$

According to FIG. 11, the two curves obtained for the two simulations are quasi-identical which means that according to the method, k connections having different sporadicness values $SP_i$ are equivalent to k connections having sporadicness values equal to $SP_{eq}$.

With regard to the third parameter, the load ration $RA_i=C_S/D_{max}{}^i$ can be determined by means of an equation of equivalence between k connections having different load ratios $RA_i$ (heterogeneous configuration as regards load ratio) and k connections having equal load ratios (homogeneous configuration), noted $RA_{eq}$. This equation has the following form:

$$RA_{eq}=F(RA_i \text{ for the ex-connections } COM_i \text{ in process}) \quad (eq.3)$$

The previous equations (eq.1), (eq.2) and (eq.3) respectively deduced from studies of the three parameters, burst length, sporadicness and load ratio, enable to design a load controlling algorithm for the final layout of the method embodying the invention, based on the characteristics of equivalence between homogeneous configuration of connections and heterogeneous configuration of connections, and establishing the elaboration of a refusal or of an acceptance of a connection.

It has been seen previously that a connection set up by any one of the earth stations $ST_i$ is defined by three parameters, i.e., the length of the generated bursts $Lm_i$, the sporadicness $SP_i$ and the load ratio $RA_i=C_S/D_{max}{}^i$. For a $k^{th}$ connection request $DC_i$ from any one of the earth stations $ST_i$ is defined a variable called "total required minimum capacity" $CMR_{TOT}$ which enables evaluation of whether said connection request $DC_i$ should be accepted or refused by the central station SC. A value a the variable $CMR_{TOT}$ for the $k^{th}$ connection depends on the three respective parameters of the (k−1) connections already set up as well as the three parameters of the $k^{th}$ connection. This corresponds to the equation:

$$CMR_{TOT}=F(Lm_1, \ldots Lm_k, \ldots, SP_1, \ldots SP_k; C_S/D_{max}{}^1, \ldots C_S/D_{max}{}^k)$$

in which the parameters in brackets designate the three parameters for the k connections being set up or to be set up by the randomly selected earth stations.

The equivalence considerations deduced from the equations (eq.1) and (eq.2) enable the previous equation to be written in the form of:

$$CMR_{TOT}=g(L_{eq}, SP_{eq}, C_S/D_{max}{}^1 \ldots C_S/D_{max}{}^k)$$

Average statistical data establish that the equivalent values $L_{eq}$ and $SP_{eq}$ are respectively always below upper limits $L_{sup}$ and $SP_{sup}$, these limits being always greater than the average length $Lm_i$ and sporadicnesses $SP_i$ irrespective of the configuration of the network traffic.

The equation is thus expressed $$CMR_{TOT}=g(L_{sup}, SP_{sup}, C_S/D_{max}{}^1, \ldots C_S/D_{max}{}^k)$$

The values $L_{sup}$ and $SP_{sup}$ being constant by hypothesis, the equation can be further simplified in the form of:

$$CMR_{TOT}=h(C_S/D_{max}{}^1, \ldots C_S/D_{max}{}^k)$$

The equivalence property between heterogeneous configuration as regards load ratio and homogeneous configuration as regards load ratio $RA_i=C_SD_{max}{}^i$, mathematically represented by the equation (eq.3), contributes to simplifying function h determining the total required minimum capacity $CMR_{TOT}$ given above.

According to the equation (eq.3), k connections having different load ratios $RA_1=C_S/D_{max}{}^1$ to $RA_k=C_S/D_{max}{}^k$ are equivalent to k connections having identical load ratios which are equal to $RA_{eq}$.

To establish the relation between the load ratio $RA_{eq}$ and the total minimum capacity required $CMR_{TOT}$, the burst lengths and burstinesses are presupposed constant and respectively equal to $L_{sup}$ and $SP_{sup}$. This relation is obtained as described above.

Only the parameters $D_{max}{}^k$ and $D_{moy}{}^k$ must be supplied in a connection request message $DC_k$ for a $k^{th}$ given connection to be set up $COM_k$ by any one of the earth stations. For the $k^{th}$ connection to be set up, the equation (eq.3) is used, and the equivalent values of the sporadicnesses and average burst lengths of the connections are presupposed respectively equal to $SP_{eq}$ and $L_{eq}$ so as to deduce, as a function of the maximum bit rates of the (k−1) connections in process and the new $k^{th}$ connection to be set up, an equivalent load ratio $RA_{eq}$ for the k connections. Working from this result, the algorithm embodying the invention presented hereinafter provides computation of a sum SOM of the average bit rates $D_{moy}{}^i$ of the connections included in the k respective connection requests $DC_i$. The equivalent load ratio $RA_{eq}$ (homogeneous configuration as regards load ratio) is then multiplied by the sum of the average bit rates $$SOM = \sum_{i=1}^{k} D_{moy}^i$$

so as to obtain the total minimum capacity required $CMR_{TOT}$. The $k^{th}$ given connection is accepted if this total required minimum capacity $CMR_{TOT}$ is lower than the total capacity available for sporadic connections $C_S$, otherwise it is refused.

Figure 12:
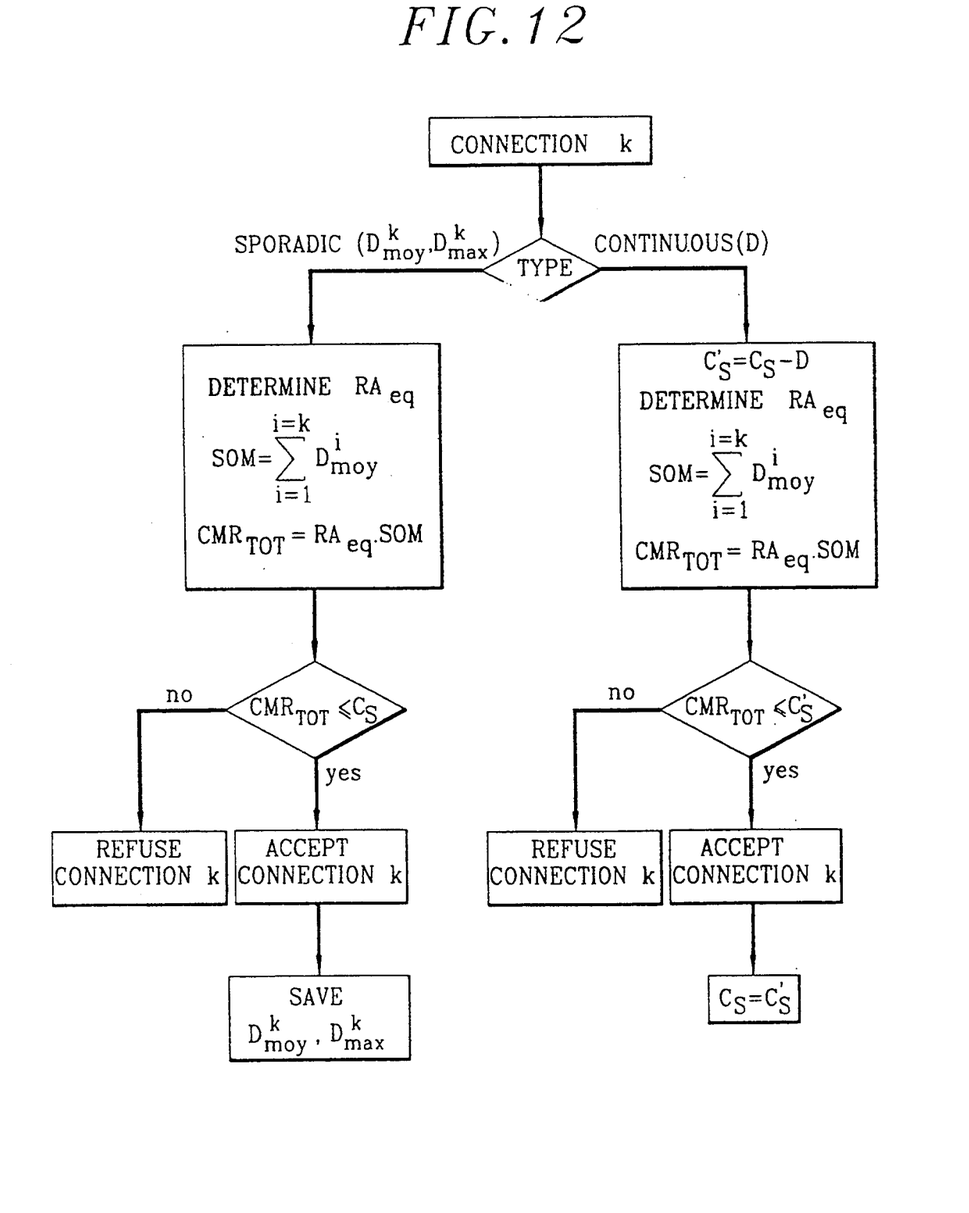
FIG. 12 shows the connection acceptance/refusal algorithm according to the invention.

The algorithm for laying out the method embodying the invention will now be presented more precisely in reference to FIG. 12.

A connection acceptance/refusal elaborating automaton in the central station SC recognizes a connection request $DC_k$ for a given $k^{th}$ connection of a sporadic nature in the process of being set up. This automaton then uses the maximum bit rate $D_{max}{}^k$ included in the connection request $DC_k$ and the maximum bit rates of the connections in process previously stored for deriving an equivalent load ratio $RA_{eq}$ relating to all connections, in compliance with the equation (eq.3).

The automaton then calculates the sum of the average bit rate $D_{moy}{}^k$ transmitted in the connection request $DC_k$ and previously stored average bit rates of the (k−1) connections in process so as to obtain SOM.

The obtained sum SOM is multiplied by the equivalent load ratio $RA_{eq}$. The result of the multiplication $CMR_{TOT}$ is compared with the total capacity available for the sporadic connections $C_S$. The connection is accepted only if this capacity $C_S$ is greater than the total minimum capacity required $CMR_{TOT}$.

In the case of a connection of a continuous nature, the capacity required for the latter dynamically influences the available capacity $C_S$ relating to connections of a bursty nature.

According to the algorithm, on the right-hand side in FIG. 12, for a new given request for connexion of a continuous nature at bit rate D to be set up, a new available capacity relating to the sporadic connections $C'_S$ is deducted by subtraction of bit rate D from the available capacity $C_S$ prior to the request for the given new connection. The total minimum capacity required $CMR_{TOT}$ for bursty communications set up is calculated as previously and compared with the new available capacity $C'_S$. If this new capacity $C'_S$ is greater than the capacity $CMR_{TOT}$, the connexion is accepted, otherwise it is refused. In this way, in the case of a request for connection of a continuous nature, the connection is accepted if the latter does not affect the total capacity required for the sporadic connections in process, in such a way that the latter are not interrupted.

Figure 13:
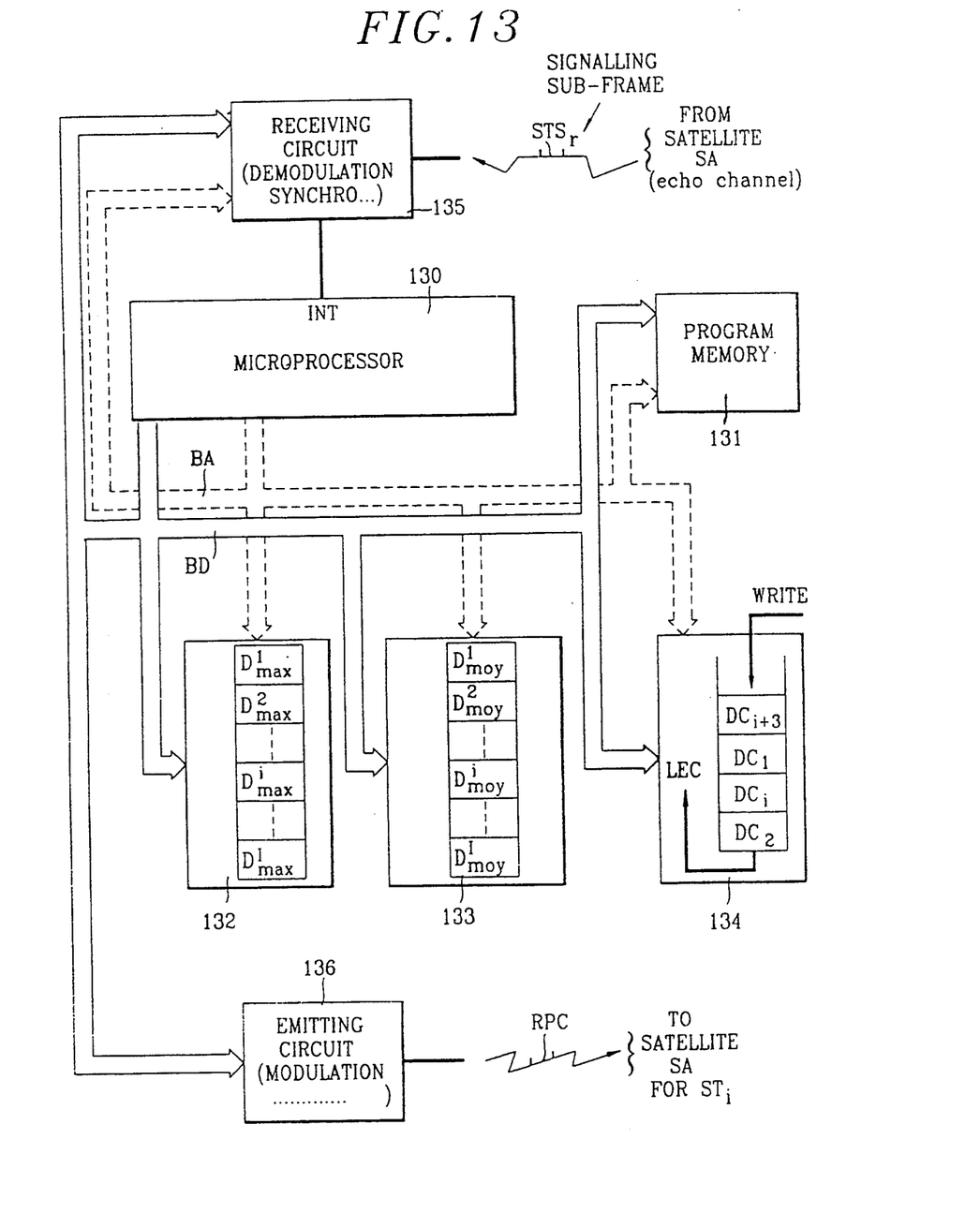
FIG. 13 is a schematic block diagram of a connection refusal/acceptance automaton for carrying out the algorithm embodying to the invention.

A diagram of the refusal/acceptance elaborating automaton for a connection in the central station SC for a layout of the above mentioned algorithm is shown in FIG. 13. The circuit comprises a microprocessor 130, a program ROM memory 131, a memory 132 for the maximum bit rates $D_{max}{}^i$ of the connections in process, a memory 133 for the average bit rates $D_{moy}{}^i$ of the connections in process, a FIFO queue 134, a receiving circuit 135 and an emitting circuit 136. The program memory 131 stores a program in low-level language corresponding to the algorithm shown in FIG. 12.

The memories 131, 132, 133 and 134, and the microprocessor 130 are connected by means of an address bus BA and a data bus BD.

The signalling sub-frame $STS_r$ carrying the connection request messages $DC_i$ retransmitted into an echo channel towards the beam A is received and decoded by the receiving circuit 135 for application to the microprocessor 130. The receiving circuit 135 notably carries out demodulation, decoding and synchronization functions. When a connection is accepted, subsequent to a computation carried out by the microprocessor according to the algorithm presented in FIG. 12 notably by reading the maximum bit rates in the memory 132 for deriving an equivalent load ratio $RA_{eq}$ and by reading the average bit rates in the memory 133 for calculating the total required minimum capacity $CMR_{TOT}$ from $RA_{eq}$, the resource allocation device as presented in the first part of the description is used for each burst of this connection, without being affected by the other connection requests in process.

What we claim is:

1. In a satellite asynchronous time-division telecommunication network, a method for allocating resources to earth stations by a central station, said earth stations receiving bursts of data cells transmitted by user stations during respective sporadic connections after set-up of said connections, said sporadic connections being defined by respective average lengths of bursts being transmitted, sporadicnesses and maximum bit rates, said method comprising the following steps:

in said central station, deciding between an acceptance and a refusal of a request for a sporadic connection to be set up, said request being transmitted in the form of a request message for sporadic connection in a signalling sub-frame of a time-division multiple access periodic frame from one of the earth stations to said central station, said decision being determined as a function of an algorithm in which said average lengths of bursts and sporadicnesses are considered as predetermined constants and which depends on maximum bit rates and average bit rates of sporadic connections in process and said to-be-set-up sporadic connection, a maximum bit rate and an average bit rate relating to said to-be-set-up sporadic connection being included in said request message for sporadic connection, subsequent to an acceptance of said to-be-set-up sporadic connection thereby defining a sporadic connection being set up, transmitting a resource allocation request message in said signalling sub-frame from said one of the earth stations to said central station in response to the beginning of reception and storing in said one of the earth stations each one of the bursts of said sporadic connection being set up which are transmitted by a user station connected to said one of the earth stations, in said central station, anticipatory reserving a resource in the form of a time interval in a data sub-frame of said time-division multiple access periodic frame, for said each one of the bursts as soon as a time interval of said data sub-frame is released so that said one of the earth stations can begin transmitting said each one of the bursts while continuing to store said each one of the bursts, and after said one of the earth stations has completely received said each one of the bursts, transmitting an end message in said signalling sub-frame from said one of the earth stations to said central station, said message including a length indication of said each one of the bursts, thereby releasing said resource allocated to said each one of the bursts when the whole of said each one of the bursts has been transmitted by said one of the earth stations.

2. The method as claimed in claim 1, wherein said algorithm comprises the steps of, for said request for a to-be-set-up sporadic connection computing an equivalent load ratio for said sporadic connections and for said to-be-set-up connection as a function notably of said predetermined constants and said maximum bit rates of said sporadic connections, computing a sum of said average bit rates of said sporadic connections, computing a product of said sum by said equivalent load ratio, and accepting said request for a to-be-set-up sporadic connection when said product is lower than a total capacity available for sporadic connections.

3. The method as claimed in claim 2, wherein connections with constant bit rate are set up by said earth stations via said network, and said algorithm for a constant bit rate connection request comprises the steps of substracting a sum of constant bit rates of said constant bit rate connections and said constant bit rate of said constant bit rate connection request from a total available capacity thereby forming a second capacity available for said sporadic connections, and accepting said constant bit rate connection request when said product is lower than said second available capacity.

4. The method as claimed in claim 1, wherein said predetermined constants are equal to respective upper limits of said average lengths of bursts and said sporadicnesses.

* * * * *